United States Patent Office 3,301,950
Patented Jan. 31, 1967

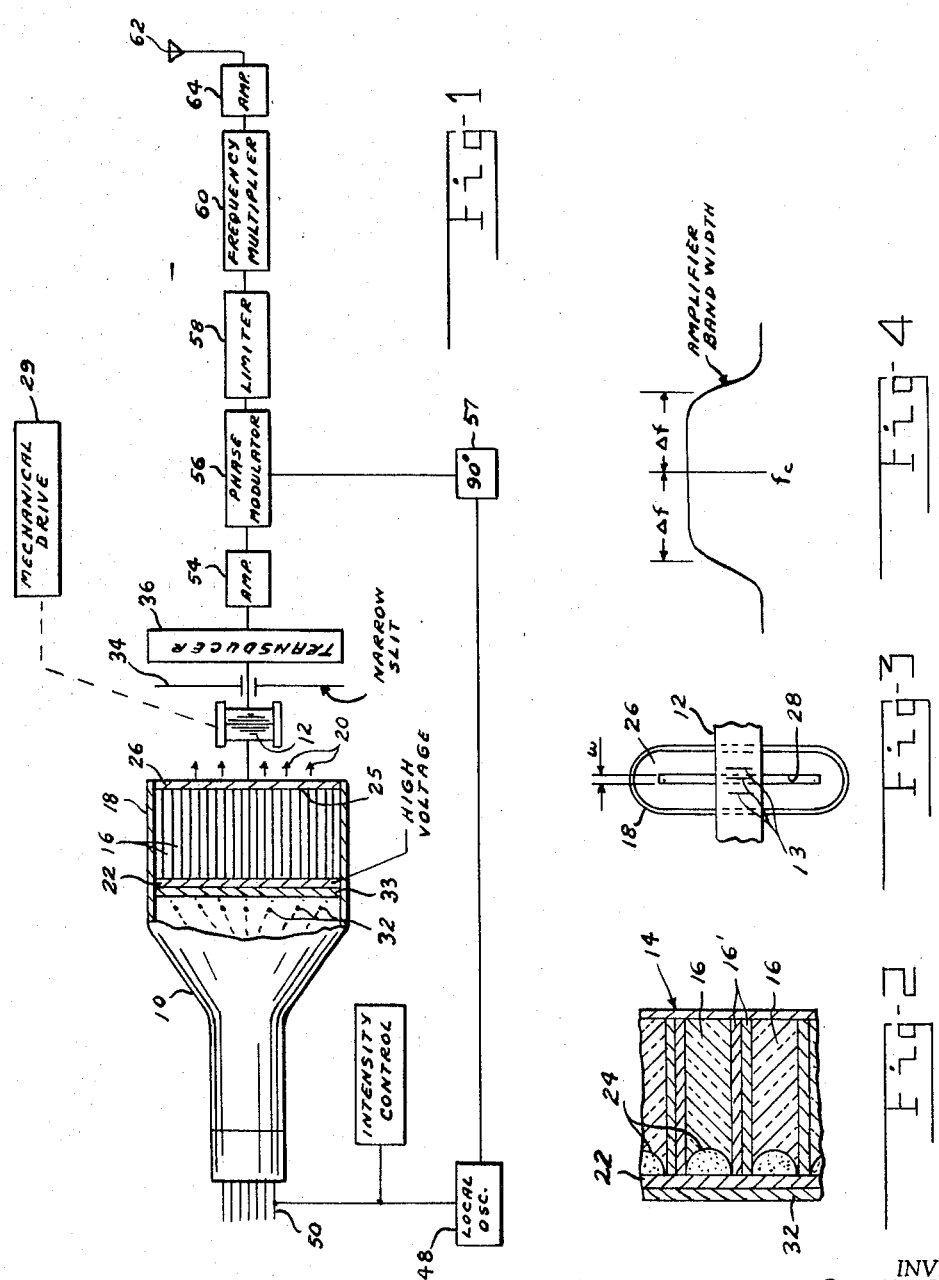

3,301,950
MODULATED LIGHT SOURCE FOR ELECTRO-OPTICAL ANALYSIS OF SPECTRAL LINES
Radames K. H. Gebel, Dayton, Ohio, assignor to the United States of America as represented by the Secretary of the Air Force
Filed Oct. 26, 1964, Ser. No. 406,633
2 Claims. (Cl. 178—7.2)

The invention described herein may be manufactured and used by or for the United States Government for governmental purposes without the payment to me of any royalty thereon.

This invention relates to an electro-optical transducer system for artificial satellites and, particularly, to a system for transmitting signals representative of the electrical image of spectral lines recorded by satellite-borne spectrographic apparatus.

In space exploration it is important frequently to make a record of the composition of various parts or substances in the outer atmosphere and to return to earth the largest possible amount of these findings while the satellite continues in orbit. The advent of artificial satellites has provided a valuable tool for making these studies inasmuch as spectrographic measurements aboard the space platform can be converted to appropriate signals for later return to earth. Reducing the weight of the space capsule is of utmost importance in space applications in order to satisfy the ever-pressing demand for maximum conservation of the fuel necessary for raising the vehicle into orbit, and for later attitude adjustments during periods when measurements are being made. Certain disadvantages of conventional satellite-borne means for spectrographic research include occupancy of the limited accommodations to the hindrance of other scientific apparatus, and undesirable addition of weight to the total payload. Another difficulty experienced heretofore in satellite-to-ground transmission of spectral lines is that in many instances noise generated by conventional light sources and vacuum tube or transistor amplifiers severely limits the detail present in the spectrographic record.

Accordingly, one object of the invention is to provide an electro-optical transducer system for artificial satellites where there is a requirement for recovering spectrographic data, such as would be acquired using the satellite as an aerial platform onto which the optical events are focused.

A further object of the invention is to provide a satellite-borne electro-optical transducer system for spectral measurements in which certain elements essential to the operation of conventional spectral line-gathering means are omitted.

Another object of the invention is to provide an electro-optical transducer system operating at lower noise levels and thereby achieving less distortion of the output electrical-image signals.

Other objects and advantageous features of the invention will be discussed hereinbelow in more detail with reference to accompanying drawings in which:

FIG. 1 shows a schematic diagram of a specific embodiment of the invention;

FIG. 2 is an enlarged fragmentary view of the optical fiber face plate in place against the viewing face of the light source tube shown in FIG. 1;

FIG. 3 is a view taken looking toward the front of the optical fiber face plate of FIG. 1 to show the slit mask therein; and FIG. 4 shows one waveform helpful in explaining the invention.

Referring now to the drawings, a prefered embodiment of the invention comprises a light source tube 10, a film 12 on which spectral lines 13 of an unknown substance whose composition is to be determined are recorded photographically by conventional spectrographic imaging, and a face plate 14 formed of an assembly of slender optical fibers 16 arranged in connected side-by-side relation with each other. As shown in FIG. 2, the face plate 14 is in the form of a cellular structure with each fiber 16 being formed with core parts having a relatively high index of refraction such as, for example, a flint glass. Outer coatings or claddings 16' are of a material having a relatively low index of refraction. For the cladding a crown glass is customarily used. In the fabrication of the face plate 14 conventional optical considerations are observed to acquire a securely bonded assembly having an airtight seal between the fibers. Thus, with fibers 16 in intimate connection with each other to form a structure completely devoid of air, the connection of face plate 14 to the enlarged envelope 18 of tube 10 obtains the necessary vacuum inside tube 10. Moreover, face plate 14 is of predetermined length suitable to achieve a considerable amount of collimation, as indicated by the lines 20, of the light transversing fibers 16. The opposite sides of the individual fibers are optically ground and polished to produce end faces readily receptive to the admission of light. The complete details of construction of the face plate 14 as used in the present invention are conventional and will not further be dealt with herein. Fiber optics plates of various design and suitable for use in the FIG. 1 embodiment are readily obtainable from major optical equipment houses.

As further shown in FIG. 2, the ends of fibers 16 which face toward anode 22 are slightly concave and are filled by vapor deposition techniques or the like with a phosphorescent material 24 of the type ordinarily employed in cathode ray tubes and other image-forming tubes used to produce image-forming light. Under electron bombardment the phosphor becomes luminous and, being in optical contact with the core parts of fibers 16, the phosphor-emitted light passes into fibers 16 and is transmitted to viewing surface 25 of face plate 14. A mask 26 (FIGS. 1 and 3) placed against the viewing surface end of face plate 14 is prepared with a narrow oblong slit 28 through which light leaving fibers 16 is permitted to fall on film 12.

The movement of film 12 is at right angles to the major axis of slit 28, as shown in FIG. 3. As seen in FIG. 1, it will be understood that film 12 likewise moves transverse to the major axis of slit 28, i.e., normal to the paper in FIG. 1. A mechanical drive means 29 coupled to the spool 31 from which film 12 is taken imparts continuous motion to film 12 at a constant rate in a direction transverse to spectral lines 13. Hence, the spectral lines are scanned along the λ or wavelength axis.

Light source tube 10 is similar to a conventional cathode ray tube except for the addition of flooding and imaging sections, and since its construction forms no part of this invention no more is illustrated than is necessary for an understanding of the invention. Accordingly, tube 10 may be of the Iatron design manufactured by ITT Industrial Laboratories. In tubes of this type, the flooding section consists of a flooding gun and an electron optical system which give a very wide dispersion of the electrons 32. These form a similarly wide diameter, low density flooding beam which covers a storage screen 33 comprised of a fine mesh metal screen coated on the gun side with a thin dielectric serving as the storage surface. Anode 22 is the viewing screen, i.e., the display area, and is equivalent to the viewing screen found in CRT's. Upon being exposed to the light from storage screen 33, phosphorescent material 24 will be activated, as previously described, sending closely spaced, substantially parallel streams of light through slit 28.

The width of slit 28, i.e., the dimension $w$ indicated in FIG. 3, may be adjusted to suit various applications and will in most cases be determined by the type of spectrographic analysis to which the apparatus of the FIG. 1 embodiment will be put. As such, the width $w$ may, for example, be on the order of 2.0 to 5.0 microns or so, or the width can be made larger if the consequent reduction in the sharpness of the lines can be tolerated. For simplicity of illustration, the width $w$ as shown in FIG. 3 is greatly exaggerated, its actual size being, of course, much smaller in comparison to the size of mask 26. Accordingly, the collimated light admitted to film 12 produces a spectral line image which falls on an area including a very narrow slit 34. The light passing slit 34 reaches the transducer 36, which may be a photomultiplier, for example, and is directly related to the characteristics of the spectral line information on film 12. The output of transducer 36 is therefore a current proportional to the frequency distribution of the energy of the unknown substance under investigation.

In FIG. 1, the light supplied by tube 10 is alternately increased and decreased in brightness at a periodic rate by a radio frequency local oscillator 48 of carrier frequency $f_c$ coupled to control grid 50 of tube 10. With the electron gun emission of tube 10 varying at the carrier frequency the light emitted by tube 10 glows alternately bright and dim at a very rapid rate. The purpose of intensity control 52 is to adjust the mean intensity of the light source. The frequency of oscillator 48 preferably is selected in accordance with the law $1/f$, which refers to the inverse variation of noise with frequencies up to certain values. As one example, the advantageous features of the invention may be obtained with 100 kc. as the carrier frequency $f_c$. However, it will be apparent that for each particular use of vacuum tube or transistor amplification the frequency $f_c$ may understandably be selected to have one of a number of appropriate values.

The oscillator light flood falling on film 12 is modulated in accordance with the characteristics of the spectral lines 13. That is, the light to form the images of the spectral lines found on film 12 reaches transducer 36 and is directly related to the images of different wave lengths occurring in that section of film 12 imaged in slit 34. With film 12 rolling past slit 34 at a constant rate, the distinctive features of the spectrogram caused by different densities, widths, etc. of the individual spectral lines are transduced to electrical currents defined as a function of $\lambda$, i.e., as a function of their position on the film strip. The effect of the spectral record on the light oscillations $f_c$ may conveniently be compared to the action of a modulating signal $f_m$ found in conventional amplitude modulation systems for modulating an oscillating electrical wave. By this analogy, the resulting modulation leaving transduced 36 to amplifier 54 will be understood to consist of an amplitude modulated electrical wave carrier frequency $f_c$ having sidebands $\pm f_m$. As used in the present invention, $f_m$ is the value of the highest modulating frequency determined by an analysis of the step function which each spectral line in itself represents and which is considered essential enough to be transmitted from the satellite. In accordance with the invention, the bandwidth of amplifier 54 may be pictured as shown in FIG. 4, covering the range $f_c - f_m$ to $f_c + f_m$ and thereby insuring faithful reproduction of the important components of the modulation products.

The output of amplifier 54 is applied to a phase modulator 56 fed simultaneously with a constant amplitude signal at the carrier frequency $f_c$, derived from local oscillator 48 and shifted in phase 90° by a phase shift 57. Consequently, both the amplitude modulated wave from amplifier 54 and 90° phase-shifted constant amplitude oscillatory wave of the carrier frequency $f_c$ are present at the output of phase modulator 56.

The sum of the amplitude and phase modulated waves at the output of phase modulator 56 is clipped in one or more limiters 58 of any suitable type, such as biased diodes. The limiter 58 operates conventionally to remove the amplitude fluctuations from the wave so that the signal applied to frequency multiplier 60 is phase modulated only. The frequency multiplier 60 or any appropriate number of such multipliers is used to raise the carrier frequency at antenna 62 above that of oscillator 48. Such a frequency increase either singly or successively effected is consistent with a desire to have the radiated carrier frequency higher than the local oscillator frequency $f_c$. Following amplification by amplifier 64, which may be a push-pull connection, the phase modulated radio frequency energy is coupled to antenna 62.

That part of the present invention extending backwards from antenna 62 up to and including phase modulator 54 and phase shifter 57 may be identified with similar elements described and claimed in my United States Patent No. 3,046,333 and, therefore, no claim of patentable novelty is made herein based solely on the described method of conversion of an amplitude modulated wave to a phase modulated wave.

Summarizing briefly, amplifiers used in conventional spectrographic transmission systems must have a lower video frequency response which extends very close to the direct current level or, at least, to the range 100 c.p.s. or so. Amplification of signals in this lower range generally is accompanied by considerable noise which leads in inescapable distortion if the level of the intelligence is held sufficiently high to allow some signal increase. In the illustrated embodiment, modulation of the oscillatory high frequency light source by the spectral lines produces a carrier system which substantially avoid the $1/f$ noise characteristic of low frequency-responsive amplifiers. Furthermore, conventional constant light sources have a color temperature of around 2000° K. which is considerably lower than the 6000° K. color temperature at which photosensitive materials are generally most efficient. Also, the usual procedure in standard apparatus employing a steady light source is to follow the light source with a resolution filter in turn followed by an additional collimating lens which lies just in advance of the slit which images the spectrographic record on the transducer. One such arrangement showing an example of the prior art relationship of these three elements is described in my United States Patent No. 3,115,545. By the present invention arrangement of eliminating the requirement for monochromatic light, relying on the built-in collimating action inherently produced by the optical fiber mask, and bringing the first slit mask into close juxtaposition with the display face of the light source, the area between the light-emitting end of the light source and the spectrographic record is drastically reduced to a minimum. This leads to a considerable gain in optical compactness, gives a layout which now becomes much easier to fabricate, and releases to other apparatus an amount of space formerly occupied by these elements.

Although only one embodiment of the invention has been illustrated and described, it will be apparent to those skilled in the art that various changes and modifications may be made therein without departing from the spirit of the invention or the scope of the appended claims.

I claim:

1. A system for transmitting spectrographic information comprising: a source of substantially collimated light, oscillator means coupled to said source for alternately increasing and decreasing the brightness of the light about a mean level at a high frequency carrier rate, masking means at the viewing surface end of said source opaque to said light except along a narrow oblong slit therein, a spectrogram in the form of a photographic film disposed to be illuminated by light passing through said slit, said film having a wavelength axis perpendicular to the major axis of said slit and including spectral lines perpendicular to said wavelength axis, transducer means for converting light input thereto into an electrical signal proportional to the light intensity, slit means placed between said film and said transducer means for imaging the illuminated spectral lines on said transducer means, means for moving said film relative to said slit means at constant speed and in the direction of said wavelength axis, whereby said electrical signals at the output of said transducer means are amplitude modulated according to the frequency distribution of the individual spectral lines, an amplifier receiving said amplitude modulated electrical signals, phase shift means coupled to said oscillating means for shifting the carrier wave thereof by ninety degrees, phase modulating means coupled to said amplifier and to said phase shifting means for generating from the two phase quadrature related carrier waves a carrier wave modulated both in amplitude and phase, limiting means coupled to the output of said phase modulating means for removing the amplitude modulation fluctuations from said double-modulated carrier wave, multiplying means receiving the phase modulated wave from said limiting means for increasing the carrier frequency of said phase modulated wave, an antenna, and amplification means feeding into said antenna from said multiplying means.

2. A system for transmitting spectrographic information comprising: a source of light including a fluorescent screen, said source adapted to provide an electron beam to flood said screen substantially uniform with electrons, a fiber optics plate in place over said screen for generating substantially collimated light, oscillator means of predetermined carrier frequency coupled to said source in beam intensity controlling relation for alternately increasing and decreasing the brightness of the light, masking means in the path of the collimated light projected by said fiber optics plate opaque to said light except along a narrow oblong slit therein, a spectrogram in the form of photographic film positioned in the path of the light admitted through said slit, said film having a wavelength axis perpendicular to the major axis of said slit and including spectral lines perpendicular to said wavelength axis, a transducer for converting light incident thereon into an electrical signal proportional to the light intensity, slit means in place between said film and said transducer for imaging the spectral lines on said transducer, motor means for moving said film relative to said slit means at constant speed and in the direction of said wavelength axis, whereby the electrical signals at the output of said transducer have amplitude modulation characteristics determined by the frequency distribution of the individual spectral lines, an amplifier receiving said amplitude modulated signals from said transducer and having a bandwidth sufficient to pass the value of the highest frequency component present in each spectral line, phase shift means coupled to said oscillating means for shifting said carrier frequency wave by ninety degrees, phase modulating means fed by said amplifier and by said phase shift means for generating from the two phase quadrature related carrier waves a resultant carrier wave modulated both in amplitude and phase, limiting means coupled to the output of said phase modulating means for removing the amplitude modulation from said amplitude and phase modulated carrier, multiplying means receiving the phase modulated wave from said limiting means for increasing the carrier frequency of said phase modulated wave, an antenna, and amplification means feeding into said antenna from said multiplying means.

References Cited by the Examiner

UNITED STATES PATENTS 3,224,322  12/1965  Westbrook _____ 88—14

DAVID G. REDINBAUGH, *Primary Examiner.*

R. L. RICHARDSON, *Assistant Examiner.*